United States Patent
Hechtle et al.

(10) Patent No.: US 7,354,350 B2
(45) Date of Patent: Apr. 8, 2008

(54) TOOLS AND METHODS FOR FINISHING A PREVIOUSLY CREATED THREAD WITHOUT CUTTING

(75) Inventors: Dietmar Hechtle, Pegnitz (DE); Helmut Glimpel, Lauf (DE)

(73) Assignee: Emuge-Werk Richard Glimpel GmbH & Co. KG Fabrik fir Prazisionswerkzeuge, Lauf (DE)

( * ) Notice: Subject to any disclaimer, the term of this patent is extended or adjusted under 35 U.S.C. 154(b) by 216 days.

(21) Appl. No.: 11/178,837

(22) Filed: Jul. 11, 2005

(65) Prior Publication Data

US 2006/0005374 A1 Jan. 12, 2006

(30) Foreign Application Priority Data

Jul. 12, 2004 (DE) .................. 10 2004 033 772

(51) Int. Cl.
*B21J 13/02* (2006.01)
(52) U.S. Cl. ........................ 470/204; 470/96
(58) Field of Classification Search ................. 470/96, 470/105, 198, 199, 204; 408/220, 221, 222
See application file for complete search history.

(56) References Cited

U.S. PATENT DOCUMENTS

| | | | | |
|---|---|---|---|---|
| 2,787,798 A | * | 4/1957 | Rosan | 470/204 |
| 2,807,813 A | * | 10/1957 | Welles, Jr. | 470/204 |
| 2,991,491 A | * | 7/1961 | Welles, Jr. | 470/204 |
| 3,069,941 A | | 12/1962 | Baubles | |
| 3,171,146 A | | 3/1965 | Moss et al. | |
| 6,514,148 B2 | * | 2/2003 | Glimpel et al. | 470/204 |
| 6,685,573 B2 | * | 2/2004 | Hikosaka et al. | 470/204 |
| 6,688,988 B2 | * | 2/2004 | McClure | 470/198 |
| 2001/0014625 A1 | | 8/2001 | Glimpel et al. | |
| 2001/0034188 A1 | | 10/2001 | Sawabe et al. | |
| 2003/0224864 A1 | | 12/2003 | McClure | |

FOREIGN PATENT DOCUMENTS

| | | |
|---|---|---|
| BE | 396577 A | 12/1930 |
| DE | 1527200 | 7/1971 |
| DE | 19649190 A1 | 5/1998 |
| DE | 10238775 A1 | 4/2003 |
| EP | 1106292 B1 | 6/2001 |
| EP | 1134051 A1 | 9/2001 |
| JP | 2001009637 A | 1/2001 |
| SU | 1090513 A | 5/1984 |
| SU | 1407710 A1 | 7/1988 |

* cited by examiner

*Primary Examiner*—Ed Tolan
(74) *Attorney, Agent, or Firm*—Workman Nydegger

(57) ABSTRACT

Implementations of the present invention include a thread-rolling tap, which is designed and intended for the non-cutting finishing of a previously created thread, in particular internal thread. For example, one implementation of such a tool includes at least one thread-forming portion that rotates about a tool axis, the thread-forming portion having multiple forming wedges. The forming wedges in cross-section include two flanks that diverge from one another beginning at a forming wedge tip. The forming wedge tip can be shaped as any of an acute angle, a rounded region, or a flattened region. At least one of the two flanks also include at least one expansion for positioning the forming wedge in the previously created thread. Additional implementations of the invention relate to a methods of manufacturing such a tool, as well as to methods of creating a thread.

30 Claims, 4 Drawing Sheets

TOOLS AND METHODS FOR FINISHING A PREVIOUSLY CREATED THREAD WITHOUT CUTTING

CROSS-REFERENCE TO RELATED APPLICATIONS

This application claims the benefit of priority under 35 U.S.C. § 119 to German Patent Application No. 10 2004 033 772.1, filed on Jul. 12, 2004, entitled "Werkzeug, insbesondere Gewindefurcher, ausgebildet und bestimmt zur spanlosen Fertigerzeugung eines vorerzeugten Gewindes, Verfahren zur Herstellung eines derartigen Werkzeugs und Verfahren zur Erzeugung eines Gewindes", which is incorporated herein by reference in its entirety.

BACKGROUND OF THE INVENTION

1. The Field of the Invention

This invention relates to a tool, in particular a thread-rolling tap, which is constructed and intended for finishing a previously created thread without cutting, in particular an internal thread, as well as to a method of manufacturing such a tool and a method of creating a thread.

2. Background and Relevant Art

Various tools are known for creating threaded structures, in particular threads for screw connections. Many of these tools comprise in their operating region cutting parts or blades with which to produce the thread by removal of material. Among these material-removing tools are, for example, thread cutters, screw taps and thread-milling tools. Another way to produce a thread is to change the shape of the part concerned without cutting. For this purpose, tools are known and in use that re-shape the part by applying pressure, in cold conditions. Among these non-cutting thread formers are the tools sometimes called thread-rolling taps. The advantage of these tools is that, as a result of the surface re-shaping and the associated compaction, the hardness of the material of which the part is made increases in the region of the threaded profile, so that the resulting screw thread is more resistant to wear and tear.

Known thread-rolling taps, in particular for producing internal threading, comprise a shank and an operating region. The shank is typically made in cylindrical form, and its end facing away from the work piece is gripped and held within the clamping chuck of a threading device. The operating region is in the part of the thread-rolling tap, which is opposite the shank.

The operating region is provided with a screw thread in the shape of a circumferential spiral, which represents a shape complementary to that of the thread that is to be created. In longitudinal section, which shows the thread in profile, the thread-rolling tap therefore exhibits alternating elevations (teeth or forming wedges or pressure lugs) and depressions (channels or recesses), which normally are at equal distances from one another; that is, the pitch of the thread turns is constant. The teeth or forming wedges are designed so that, in cross-section, they taper outward substantially radially, at an acute angle. The cross-sectional shape of a thread turn on the tool is ordinarily a polygon.

The basic structure of a conventional thread-rolling tap is shown in FIG. 1 and explained below. A thread-rolling tap of this kind is known, for example, from DE 199 58 827 A1. Such thread-rolling taps customarily produce a screw thread in that they are inserted into a bore that is already present, by using appropriate force to push the tool forward with the operating region in front, while rotating it about the long axis of the tool shank. In this process, the forming wedges of the thread-rolling tap are pressed into the surface of the work piece, i.e. of the bore therein. The material of which the work piece is made is thus forced substantially radially into the recesses within the operating region of the thread-rolling tap. In order to facilitate penetration of the first thread turns into the work piece surface, i.e. the interior wall of the bore, the operating region of the thread-rolling tap tapers toward the tip of the tool. The forming wedges in the tapering section of the operating region, also called the thread-forming part or portion, cause the deformation of the work piece that produces the screw thread.

The documents WO 02/094491 A1 or DE 103 18 203 A1 disclose non-cutting thread-forming tools, and methods for creating screw threads without cutting, are based on another operating principle, and can be called circular thread formers (tools) or circular thread forming (methods). These thread-forming tools comprise operating regions with one or more annular circumferential profile(s) or ridge(s) separated from one another by annular grooves. Each circumferential profile is designed with a polygonal center having several polygon corners, which serve as forming wedges; such a profile is oriented perpendicular to the axis of rotation of the tool, with no pitch. In addition, axially oriented flutes can also be provided between the individual pressure lugs on the outer surface of the tools, through which cooling fluid can be supplied. The tool is introduced, while being rotated about its own axis, into a bore with diameter larger than that of the tool, and makes a circular movement along the circumference of the bore while simultaneously being pushed forward into the bore, and thus forms the screw thread in the bore without cutting.

In the case of such thread production, employing thread-rolling taps or circular thread formers, the thread is created entirely by rolling or forming by means of the forming wedges. In the process, these forming wedges are subjected to severe stress, and hence to a high degree of wear and tear.

A known means of reducing this stress, therefore, is to prepare an initial thread in a prior stage of processing. This known processing is as follows: before creation of the final thread by rolling with the forming wedges, recesses have already been produced in the bore (i.e., work piece) surface. These recesses already show recognizable signs of the thread that is to be created, but do not yet exactly correspond in their dimensions, in particular their depth, to the cross-sectional shape of the finished thread, in particular the depth of its recesses. This means, in particular, that the outside diameter of the initial thread is smaller than that of the finished thread. The previously created thread is then finished by means of a thread-rolling tap to create the final thread; that is, forming wedges are consecutively pressed into the ground of the previously created recesses.

The prior preparation of the thread can be carried out with a tool that produces chips or shavings, so that, in this two-stage method of thread creation, the advantages of cutting and non-cutting processes can be combined.

Such a method of thread creation is known, for example, from DE 196 49 190 C2. In this method the screw thread is created by means of a tool that produces a recess by both removal and rolling of material, in which process the flanks of the thread are formed accurately in both profile and dimensions by removal of material; and, at the bottom of the thread, the diameter is such that the recess floor can be compressed to the pre-specified final diameter by means of a thread-rolling tool. Solidified threads, in particular internal threads, can be created with this method.

Known thread-rolling taps that are used for finishing an initial, previously created thread comprise a thread-forming portion with forming wedges along a spiral curve, the cross-sectional shape and dimensions of the wedges being in each case identical, so that the wedges differ from one another solely in the radial distance, separating their tips from a longitudinal axis of the tool. In this case, the radial distance of the wedge tips increases in the direction opposite to that in which the tool is pushed forward; that is, the forming wedges that act later penetrate more deeply into the surface of the work piece than the preceding wedges have done. This radial shift of the forming-wedge cross-section according to the state of the art is shown, for example, in FIG. 2, and is explained below.

In these known designs of thread-rolling taps for finishing a previously created thread, the positioning of the forming wedges near the tool tip in the recess of the previously created thread is not exactly specified, but rather exhibits a degree of freedom along the axis of the tool. The reason—as is also evident in FIG. 2—is that the forming-wedge diameter is smaller than the recess diameter at a corresponding height above the tool axis. The result is that, in particular, the first forming wedge(s) (i.e. that or those closest to the tip of the tool) is/are pressed into the surface of the previously created thread recess, not centrally, but rather with a lateral offset. In this case, one of the flanks of the forming wedge is apposed to one flank of the previously created thread

BRIEF SUMMARY OF THE INVENTION

The present invention provides one or more advantages in the art with a tool for the finishing of a previously created thread, in particular a thread-rolling tap, without cutting, such that the positioning of the tool in a previously created thread is improved. Furthermore, the present invention provides a method of manufacturing such a tool and a method of creating a thread that is improved with respect to the state of the art are disclosed.

This object is achieved with respect to the tool for non-cutting finishing of a previously created thread by the features given in apparatus claims, with respect to the method of manufacturing said tool by the features given in method claims, and with respect to the method of creating a thread by the features given in additional method claims, and with respect to the method of creating a thread by the features given in still additional method claims. Advantageous embodiments and further improvements of each of these will be apparent from the relevant dependent claims.

According to the claims, the tool, which is constructed and specified for the non-cutting finishing of a previously created thread, comprises (a) at least one thread-forming portion that can be or is rotated about the tool Maxis and consists of several forming wedges (or: forming or furrowing teeth, pressure lugs, pressure ridges),
(b) wherein the forming wedges in cross-section possess two flanks, which diverge from one another starting at a forming-wedge tip (or: forming-wedge head), in particular so as to form an acute angle or a rounded or flattened region,
(c) such that at least one of the flanks of at least one forming wedge includes at least one expansion (or: enlarged or broadened section, widened part) for positioning, in particular centering, of the forming wedge within the initially created thread.

As such, at least one implementation of the present invention includes increasing the diameter of the forming wedges in at least one sub-region by the provision of expansions at the flanks of the forming wedges. This results in a reduction, within this sub-region, of the distance between the forming-wedge flanks and the corresponding flanks of the previously created thread.

By broadening the flanks of the forming wedge, the axial degree of freedom for positioning the forming wedge within the previously created thread is at least reduced in comparison to the state of the art. As a result, the lateral offset of the forming-wedge tips that penetrate into the ground of the previously created thread recess is prevented or at least is relatively slight, which on the whole leads to a completely, or at least maximally, symmetrical formation of the thread turn. The expansion of the forming-wedge flanks thus serves an (axial) guiding function as the tool is being pushed forward into the previously created thread or into the previously created threaded bore.

Regarding the tool, it is preferably a thread-rolling tap with forming wedges disposed along a forming curve in the shape of a spiral, screw-thread or helix that passes around the tool axis under the thread pitch.

In particular, in the case of a thread-rolling tap, the thread-forming portion can be constructed as a starting or insertion portion (advance rolling region, advance forming region) such that (in the thread-forming portion) the radial separation (or: distance) between the forming-wedge tips and the tool axis increases in the direction opposite to that in which the tool is pushed forward.

The expansion is then in particular provided in the first forming wedge, i.e. the one that occupies the first position along the forming curve, proceeding in the direction opposite to that of tool advancement, and/or in several forming wedges that are preferably positioned sequentially along the forming curve.

Here the first forming wedge should be understood to be a substantially complete forming wedge, i.e. the first wedge along the forming curve in the direction opposite to that of tool advancement that has a cross-sectional shape corresponding in the broadest sense to the cross-sectional shape of subsequent forming wedges. Forming wedges considered to be incomplete are those that are produced, e.g., during the construction of a bezel at the tool tip, to facilitate positioning of the tool at the entrance to, or insertion into the previously created thread, or by the grinding process involved in the removal of burrs.

These incomplete forming wedges are ordinarily to be found at or near the anterior-most edge of the tool, in the direction in which the tool is advanced. Such forming wedges are not to be regarded as the first forming wedges in the sense of the present considerations. Nevertheless, it is entirely possible for even incomplete teeth to comprise an expansion on one side, namely on the side facing away from the tool-advancing direction. Hence, if the incomplete forming wedges are taken into account, the first forming wedge in the sense of the invention can also be the second or third or fourth forming wedge along the forming curve in the direction opposite to the tool-advancing direction.

As an alternative to a thread-rolling tap, it is also possible to design a circular thread former to incorporate the measures according to the invention, and then to perform the subsequent processing or finishing of the thread with the circular thread-forming method. The forming wedges are then provided in thread-forming portions separated from one another by distances axial to the tool axis, which have no pitch run perpendicular to the tool axis, and preferably enclose the latter in a complete or closed annular manner.

Although it is fundamentally possible to finish an external thread with such a tool, it is however preferred to employ this tool for finishing internal threads.

Expansion, broadening, or enlargement of a wedge flank can in particular be defined by the slope of the flank in relation to a straight line passing through the forming-wedge tip and oriented perpendicular to the tool axis (given a symmetrical arrangement of the cross-sectional central axis of the forming wedge). Starting from the forming-wedge tip, there is an expansion of the flank from that point on the flank beyond which a flank section following this point has a greater slope than a flank section ahead of this point. In the case of flanks that have a curvature, therefore, proceeding from the wedge tip the expansion begins at the point beyond which the flank is curved outward, i.e. curves away from the straight line defining the forming wedge, and hence also from the opposite flank. In a flank formed by linear sections, and proceeding from the wedge tip, the expansion begins at an inflection point beyond which the slope magnitude is greater than that ahead of the inflection point. Thus, the distance between flank and wedge-defining line increases more rapidly than it did previously.

In a preferred embodiment of the tool in accordance with the invention, the expansion of the flanks of several forming wedges, in particular in all forming wedges that have expanded flanks, exhibits substantially the same shape in cross-section, in particular the same profile, and/or the same dimensions.

It is also useful for the diameter of the forming wedge to be substantially the same at each height above the tool axis in the region where several wedges are expanded, in particular for all forming wedges with flank expansion.

Owing to the preceding features, the positioning of the tool in the previously created thread is stabilized over many forming wedges. Furthermore, losses due to friction and wear and tear of the tool that can arise because of undesired pressing forces between the flanks of forming wedge and recess, if their dimensions are different, are avoided.

A preferred further development of the tool in accordance with the invention provides that at least several consecutive forming wedges with expanded flanks have substantially the same cross-sectional shape in a forming region that extends from the wedge tip to the expansion, at least in sections thereof and preferably throughout that region.

The preferred cross-sectional shape of the forming region is a convex curvature in a first section, proceeding from the wedge tip, and a concave curvature in a subsequent second section. Alternatively, or in addition, in a third section that then follows, in particular in a region transitional to the expansion, it is again convexly curved. Such embodiments are particularly simple to manufacture, in particular by grinding, preferably by wheel dressing.

The cross-sectional shape of the forming region can furthermore be at least approximately polygonal, in particular a triangle or a quadrangle, preferably a trapezoid, in which case the corners of the polygon can be made sharp and/or rounded. In particular, the cross-sectional shape of the forming region can be in isosceles triangle, preferably with a 60° internal angle, or an equilateral triangle or a triangle with rounded and/or flattened tip. It is also useful for the transitions between forming region and expansion of the flank to be at least partially rounded.

It is this forming region that ensures the actual functionality of the tool or thread-rolling tap, i.e. the finishing of a previously created thread. For it to do so—as explained above—it can be designed in a great variety of ways.

In an especially advantageous embodiment of the invention, the dimensions of the cross-sectional shape of the forming region, in particular the cross-sectional profile of the forming region, increase in forming wedges sequential to one another in the direction opposite to the tool-advancing direction, in particular along the forming curve. In this case it is entirely possible for consecutive forming wedges to have identical dimensions in certain sections, as long as the dimensions increase over the forming region as a whole. However, it is preferred for the dimensions to increase continuously, preferably linearly. As a result—given a comparable shape of the cross-sectional profile—a profile gradation is produced with respect to the forming region of the successive forming wedges. In this way, the final thread is created from the initial thread by the forming wedges, in particular their forming regions, one step after another. The stresses resulting from the rolling process are distributed nearly uniformly over the operative forming wedges.

In a further development of the tool in accordance with the invention, the flanks of at least several consecutive forming wedges along the forming curve exhibit a conical nature; that is, in particular along the forming curve, the corresponding flank points of each of the forming wedges are positioned so that they would coincide with the surface of a conical envelope. The conical angle, i.e. the angle of a straight line within the conical surface with respect to the axis of the cone, can be different for different flank points; in particular in the forming region, preferably at the forming-wedge tip, it is between 5° and 20°, preferably between 8° and 16°, and/or in the region of the expansion between 0° and 2°, preferably about 1°.

It is also useful and advantageous for at least the thread-forming portion of the tool to comprise a core that extends along the axis of the tool. The tool core can also exhibit a conical nature at least over sections along the tool axis; that is, it can have a conical external form. Preferably, however, the tool core should have a constant diameter along the tool axis. The forming wedges should be disposed at the outer surface of the tool core. In addition, in order to implement the stepwise rolling or forming of the finished thread from the previously created thread, the height of the forming wedges above the tool core (i.e., along the forming curve) should increase in the direction opposite to the tool-advancing direction.

In an especially preferred and advantageous embodiment of the tool in accordance with the invention, the flank expansion is constructed as a pedestal, or base of the forming wedge. Here "pedestal" should be understood to designate an expanded region at the base of the forming wedge, i.e. in a position opposite to the wedge tip. In the case of a forming wedge with a pedestal-type expansion, the expansion is at the end of the wedge in the direction toward a tool core. Then the forming wedge comprises a forming region that includes the wedge tip, and an expansion region that includes the base of the wedge. Preferably the two regions merge either continuously or abruptly, with no other intervening regions.

According to a useful further development it is provided that as the tool is advanced into the previously created thread, the expansions of the forming wedges engage in recesses of the previously created thread for the purpose of positioning, in particular centering, the forming wedge in the recess of the previously created thread. In this case, the expansions reduce the distance separating the forming wedge from the previously created thread, as a result of which the degree of freedom for positioning the wedge in the recess is at least reduced. The forming wedges, in particular their expansions, thus serve an axial guidance function with respect to the disposition of the tool within the previously created thread.

It is also useful and advantageous for at least the tip of at least one forming wedge to penetrate into a floor section of the recess in the previously created thread as the tool is being advanced. As a result the material of the work piece within which the thread is being constructed undergoes cold-forming. In this way the actual rolling or forming function of the forming wedge and thus of the tool is implemented. The forming wedge therefore combines the axial guidance function achieved by its expansions with the rolling function achieved by its tip and/or adjacent flank sections. In other words, the expansion region of the forming wedge fulfills the axial guidance function and the forming region of the forming wedge fulfills the rolling function.

According to an advantageous further development it can also be provided that the thread-forming portion, in particular on its side positioned in the tool-advancing direction, comprises an insertion portion with one or more, in particular consecutive, forming wedges having expanded flanks, the wedge tips of which do not penetrate into a floor section of the recess in the previously created thread as the tool is advanced into the latter. In other words, an insertion portion is disposed ahead of the forming wedges with rolling function, in the tool-advancing direction.

The forming wedges in the insertion portion fulfill only the axial guidance function, and make no contribution toward proceeding with the creation of the thread. However, they do ensure that the following wedges with rolling function will be positioned as precisely as possible. Hence, the latter need not be provided with guidance features, so that the forces acting on these rolling wedges are (almost) entirely available for rolling. For further assistance in this regard, it can be provided that the insertion portion includes the above-mentioned first forming wedge along the forming curve in the direction opposite to the tool-advancing direction.

According to one embodiment of the tool it is provided that the diameter of the forming wedge in at least one sub-region of the expansion amounts to at least 90%, in particular 95%, preferably about 99% of the diameter of the recess of the previously created thread at the corresponding height above the axis of the inserted tool. Theoretically the forming-wedge diameter could also be equal to the diameter of the recess in the previously created thread at the corresponding height above the axis of the inserted tool. However, this would make it more difficult to insert (manipulate) the tool into the previously created thread. In contrast, a slight difference assists insertion by making an appropriate tolerance available.

It can also be useful for the diameter of the forming wedge in a forming region extending from the wedge tip to its expansion, as long as it does not penetrate as far as the ground section of the recess in the previously created thread, to be less than 90%, in particular less than 85%, preferably less than 80% of the diameter of the recess in the previously created thread at the corresponding height above the axis (A) of the inserted tool. As a result, the free volume available to each forming wedge is sufficient to accommodate the volume of material displaced by the rolling process. The displaced material can flow in a direction substantially radial with respect to the tool axis.

It is also advantageous for the difference between recess diameter and the associated forming-wedge diameter to be smaller in the expansion region than in the forming region, in particular at least 10% smaller, preferably at least about 25% smaller.

The embodiments mentioned above provide in particular that the dimensions, in particular the diameter of the forming wedge, in the forming region of the forming wedge correspond approximately to the dimensions of a comparable forming wedge according to the state of the art, whereas in the expansion region of the forming wedge these dimensions, in particular the diameter of the forming wedge, are distinctly wider than in comparable forming wedges according to the state of the art.

According to a further development the diameters of the forming wedges disposed along the forming curve in the direction opposite to a tool-advancing direction increase in a forming region that extends from the tip of the forming wedge to its expansion, such that the increase is related in particular to the increase of the radial distance separating the forming-wedge tips from the tool axis. This relation can be a nonlinear dependence, but preferably it concerns a linear dependence.

It can also be provided that the last forming wedge of the thread-forming portion, i.e. the last one in the direction opposite the tool-advancing direction, in particular along the forming curve, does not comprise any expansion of its flanks and that its cross-sectional form and/or dimensions correspond substantially to the cross-sectional form and/or dimensions of the finished thread recess. Hence the thread will have been essentially finished after this last forming wedge in the thread-forming portion has passed through.

In an especially advantageous and preferred embodiment of the tool, in accordance with the invention, the thread-forming portion is followed, in the direction opposite the tool-advancing direction, by a calibration portion (equalization portion) with forming wedges disposed in sequence, preferably along a curve or thread turn, which runs around the tool axis in the form of a spiral or screw-thread or helix. In particular, the calibration portion is immediately adjacent to the thread-forming portion, such that, preferably, the forming curve in the thread-forming portion merges continuously with the curve in the calibration portion, and such that both curves exhibit the same pitch along the tool axis. Whereas the thread-forming portion serves predominantly to give shape to the thread, the calibration portion is primarily provided to calibrate and smooth the thread. As a result, the thread is finished in an especially exact manner. The calibration portion further serves to guide the tool within the thread. This guidance function of the calibration portion can, however, be dispensed with if the above-mentioned insertion portion is present.

According to a useful further development in this regard, it is provided that the radial distance separating the forming-wedge tip from the tool axis in the calibration portion is substantially the same throughout or else decreases in the direction opposite the tool-advancing direction and, preferably, in particular at the transition to the thread-forming portion, corresponds to the largest radial distance of the tips of the forming wedges in the thread-forming portion. It can also be provided that the cross-sectional form, and/or the cross-sectional dimensions of the forming wedges in the calibration portion, is/are substantially the same throughout, and in particular correspond(s) substantially to the cross-sectional shape and/or dimensions of the finished thread recess.

Preferably at least the thread-forming portion and/or the calibration portion have a cross-section perpendicular to the tool axis that is approximately polygonal, preferably with a number "e" of corners amounting to three of four or fie or six or seven. This provision can be supplemented by disposing every $e^{th}$ one of the immediately sequential forming-wedge tips in a single plane, such that this plane contains the tool axis. Alternatively, however, every $e^{th}$ forming-wedge tip can also be disposed in a pattern that runs around the tool axis, in particular in the form of a spiral or screw-thread or helix.

Furthermore, every $e^{th}$ forming-wedge tip is preferably disposed on a wedge-tip axis that, in the thread-forming portion, is inclined at a pre-specified angle to the tool axis, and, in the calibration regions, runs parallel to the tool axis.

In a useful and preferred embodiment of the tool in accordance with the invention, and proceeding in the direction opposite to the tool-advancing direction, the thread-forming portion and/or calibration portion is followed by a tool shank by way of which to fix the tool in a thread-producing device (tool machine).

The tool is usefully made substantially of high-speed steel and/or a hard metal and is preferably—in particular in the case of tools for demanding applications—covered by a layer of a hard material suitable to protect it against wear.

According to the claims, a method in accordance with the invention for manufacturing a tool that corresponds to the preceding explanations provides that the forming wedges be at least partially created by grinding, in particular by means of wheel dressing. In this process each wedge initially has a single, standard shape, i.e. it is a forming-wedge blank, and these are disposed in particular on a tool core. By means of grinding, this blank is then converted to the desired shape. This method makes it particularly simple to generate forming wedges with a rounded profile in the forming region, and an expansion in the form of a pedestal. It is also simple in this way to generate forming wedges with a profile that is substantially identically shaped in each wedge, but is radially shifted, producing the above-mentioned sequence of forming wedges with profile gradation.

According to the claims, the method in accordance with the invention for creating a third in a work piece, in particular in an internal thread, provides (a) that in or on the work piece an initial screw thread is created, in particular either with or without cutting, preferably by tapping and/or milling and/or rotating and/or grinding and/or winding and/or rolling, and (b) that the finishing of the previously created, initial thread is accomplished without cutting by employment of a tool, in particular a thread-rolling tap, preferably according to the preceding explanations, with at least one forming wedge that in cross-section comprises two flanks, said forming wedge being positioned, in particular centered, in the previously created thread by means of at least one of its flanks, preferably by at least one expansion of at least one of its flanks.

The advantages of this method will be evident from the preceding considerations, in particular from the general presentation regarding thread rolling in previously created threads and from the explanation of the advantages of the previously described tool in accordance with the invention.

In the process of finishing the thread according to the preceding method the tool is thus positioned, by way of one or more forming wedges, relative to the previously created thread, i.e. in particular to the recess in the previously created thread. Its degree of freedom in such positioning is determined by the distance of its flanks from sides or flanks of the recess in the previously created thread. As a rule, one of the flanks of the forming wedge will be resting against and/or glide along one flank of the recess, and will thereby position the forming wedge, and hence the entire tool, relative to the recess of the previously created thread, i.e. the thread as a whole. So that the wedge will be centered in the recess as accurately as possible, the wedge diameter should be, at least in certain sections according to the invention, hardly or at least not much smaller than the diameter of the recess at the same height above a central axis of the tool. Preferably, the wedge diameter in at least one sub-region should be at least 90%, in particular 95%, preferably about 99% of the diameter of the recess in the previously created thread.

This relation can also apply over the entire height of the forming wedge, though it is sufficient for it to be present in particular sections in the form of an expansion of at least one of the forming-wedge flanks, to reduce the play of the wedge within the recess. In particular, the profile gradation of consecutive forming wedges should be designed such that even the anterior-most forming wedges, which are responsible for positioning, have as little play as possible within the recess; that is, the diameter of these positioning wedges likewise departs at least in sections—as described above—hardly at all from the diameter of the recess.

The creation of the initial thread usefully comprises the following steps:

(a) Preparation of an initial bore.

(b) Creation of the initial thread with a screw-tap in such a way that the outside diameter of the initial thread is smaller than the intended outside diameter of the finished thread.

Preferably the process of finishing the thread comprises the following steps:

(a) At least a thread-forming portion of the tool is rotated about a tool axis.

(b) The thread-forming portion, with forming wedges arranged in sequence along a forming curve in the form of a spiral or screw-thread that runs around the tool axis (A), is moved in a tool-advancing direction.

(c) During this movement in the tool-advancing direction the forming wedges engage the previously created thread, in particular at least some of the forming wedges are pressed into a work piece surface in the region of the previously created thread, in order to continue or finish the creation of the thread.

Instead of this thread-rolling procedure, a circular thread-forming procedure according to the claims can be employed.

As a further step in finishing the thread, forming wedges in a calibration portion adjacent to the thread-forming portion in the direction opposite to the tool-advancing direction, creates a smooth and/or calibrated thread.

Alternatively, or in addition, the method of finishing the thread can also provide for forming wedges in an insertion portion ahead of the thread-forming portion in the direction of tool advancement, in particular those wedges with expanded flanks, to engage the previously created thread during the tool-advancing movement, but not to be pressed into a surface of the work piece in the region of the previously created thread. These forming wedges then constitute the above-mentioned insertion portion, and serve the axial guidance function.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In the following, the invention is explained with reference to exemplary embodiments, the description of which is assisted by the attached drawings, wherein:

FIG. 3 is a schematic drawing to show how a forming-wedge profile according to the conventional is disposed in a previously created thread recess, and the distances separating the;

LIST OF REFERENCE NUMERALS

Figure 1:
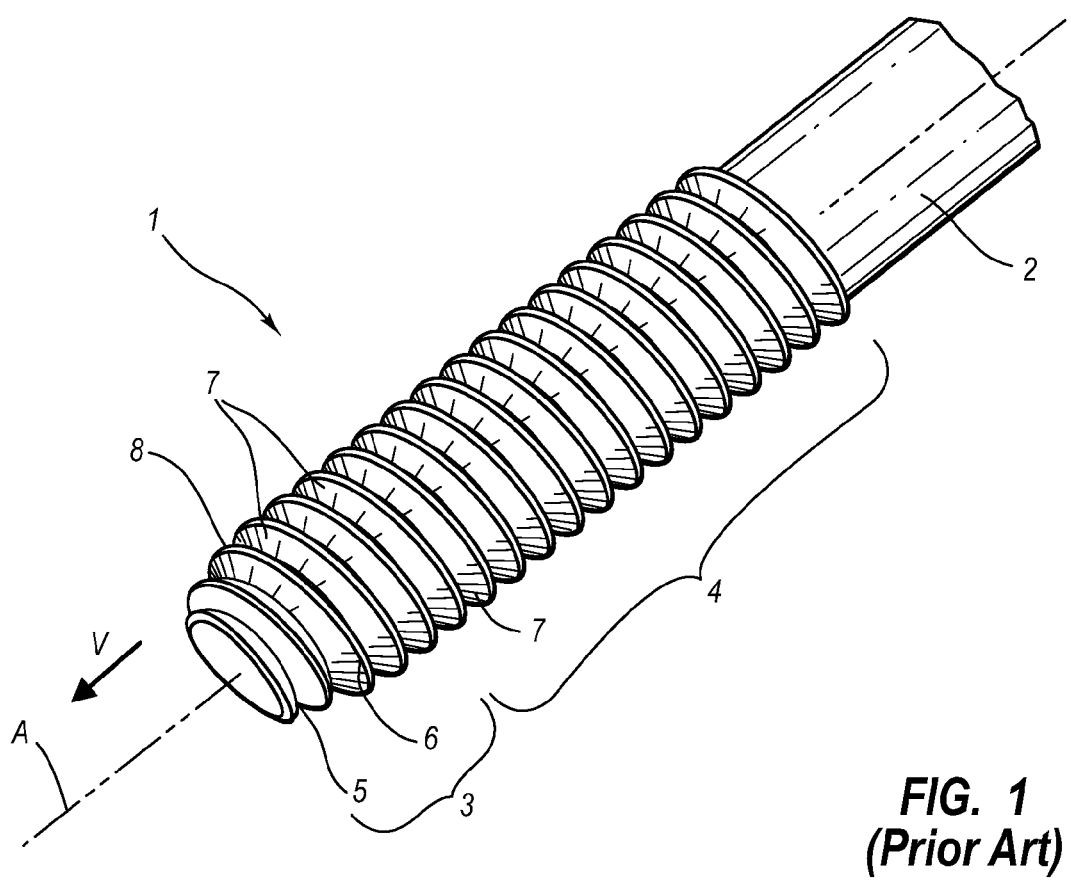
FIG. 1 is a conventional perspective view of a thread-rolling tap.

1 Thread-rolling tap
2 Tool shank
3 Thread-forming portion of tool
4 Calibration portion
5 Tool core
6 Forming curve
7 Forming wedges (pressure lugs), forming-wedge profile
8 First forming wedge, first forming-wedge profile
9 Forming-wedge tip
10 Previously created thread
11 Forming-wedge flanks
12 Previously created thread recess 11
13 Flanks of the previously created thread recess 11
14 Finished thread
15 Finished thread recess
16 Incomplete forming wedge
17 Floor of the finished thread recess
18 Flank of the finished thread recess
19 Expansion
20 Forming region
21 Expansion region
22 Profile shoulder
23 Transition point
24 Insertion portion
A Tool axis
V Tool-advancing direction
Δa Distance
ΔR Distance
α Angle between forming-wedge flanks

DETAILED DESCRIPTION OF THE PREFERRED EMBODIMENTS

In FIG. 1 to FIG. 11, parts and sizes that correspond to one another are identified by the same reference numerals.

FIG. 1 shows a conventional thread-rolling tap 1, which comprises a tool shank 2 and two operating portions, namely a thread-forming portion 3 and a calibration portion 4. A tool axis A, which simultaneously represents an axis of rotation of the thread-rolling tap 1, runs parallel to the longitudinal extent of the thread-rolling tap 1 through the middle of the thread-rolling tap 1. An advancing direction V of the thread-rolling tap 1 runs parallel to the tool axis A, and is indicated in FIG. 1 by the direction of the arrow. The thread-rolling tap 1 serves to produce an internal screw thread without cutting, with no need for an initial thread to be previously created. However, the basic structure of this known thread-rolling tap is consistent with the basic structure of a thread-rolling tap intended for finishing a previously created thread.

The tool shank 2 can, for example, be cylindrically constructed, and, as a rule, has a square area (not shown here) on the side that is mounted in the clamping chuck, for transmission of the rolling moment. The tool shank 2 is, in this case, fixedly connected to the adjacent calibration portion 4, and, in particular, the tool shank 2 and the operating portion 3, 4 are constructed in one piece. The operating portions 3, 4 have a polygonal cross-section perpendicular to the tool axis A, which approximates the form of a triangle.

In the thread-forming portion 3 and in the calibration portion 4, a winding with forming wedges 7 (pressure tunnels) disposed along a forming curve 6 is attached to a tool core 5, which likewise has an approximately triangular cross-section. The forming curve 6 runs in the shape of a spiral or screw-threaded, i.e. with pitch, around the tool core 5. Each of the forming wedges 7 has at its free outer end a forming wedge tip 8 (forming-wedge head). The forming wedges 7 are disposed along the forming curve 6 and hence, because of the pitch of the forming curve 6, are axially displaced along the tool axis A, on the corners of the polygonal tool core 5.

In the case illustrated here, each turn of the winding and hence of the forming curve 6, i.e. each loop around the tool core 5, comprises three forming wedges 7. Every third one of the forming wedges 7 positioned in immediate succession along the winding is so disposed that its forming-wedge tip 8 lies in a plane that also includes the tool axis A. Within the thread-forming portion 3, the radial distance separating the tips 8 from the tool axis A increases progressively in the direction opposite to the direction V in which the thread-rolling tap 1 is advanced.

Now, if the thread-rolling tap 1 is inserted into a bore by pushing it in the direction V, the forming wedges 7 of the thread-forming portion 3 produce a screw thread in the inner wall of the bore. In this process, the forming wedges 7 disposed consecutively along the forming curve 6 penetrate into the surface of the work piece, until a final forming wedge 7 in the thread-forming portion 3 completes the forming of the thread, which now has its full depth and width.

Further rotational movement of the thread-rolling tap 1 to move it into the advancing direction V causes the subsequent forming wedges 7, in the calibration portion 4, to calibrate and smooth the thread (thread turns or ridges) thus far created. The forming wedges 7 in the calibration portion 4 are therefore exactly matched in their dimensions and shape to the thread that is to be created. The forming wedges 7 in the calibration portion 4 that are adjacent to the thread-forming portion 3 ordinarily corresponds, in their cross-sectional shape and in their dimensions, to these adjacent forming wedges 7 in the thread-forming portion 3. Thereafter, in the direction opposite to the tool-advancing direction V, the radial distance of the forming-wedge tips 8 from the tool axis A can decrease by a small amount (not visible in FIG. 1), in order to reduce friction in the created thread, and compensate for an elastic deformation of the work piece material that normally occurs. Otherwise, owing to the tensions in this material that result from the elastic deformation, a pressure would act on the forming wedges 7 in the calibration portion 4, which would increase friction during the forward movement of the tool.

Figure 2:
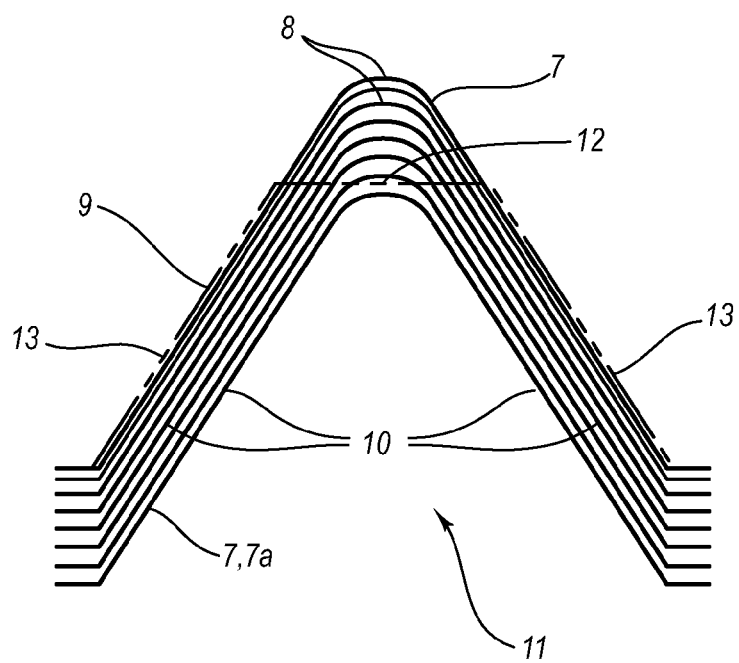
FIG. 2 shows schematically in cross-section the profile gradation of consecutive forming wedges in a conventional thread-rolling tap.

FIG. 2 shows schematically in cross-section the profile gradation of consecutive forming wedges 7 in a thread-rolling tap according to the conventional. Structures visible in this cross-sectional profile are a previously created thread 9, and a previously created thread recess 11 with flanks 13. As the tool is advanced, the forming wedges 7 of the thread-rolling tap engage this previously created thread recess 11, one after another. The profile of these forming wedges 7 in relation to the previously created thread 9 is shown schematically in FIG. 2. The tip 8 and two lateral flanks 10 of the various forming wedges can each be seen here. In the direction opposite to the tool-advancing direction, the radial distance between the forming-wedge tip 8 and the tool axis A increases. This is evident in FIG. 2 from the fact that the forming-wedge profiles 7, shown one above another, actually relate to forming wedges 7 that are arranged consecutively along the forming curve 6. Hence FIG. 2 shows the profile gradation of the consecutively arranged forming wedges 7.

It can be concluded from FIG. 2 that, according to the state of the art, the increase in height of the forming-wedge tip 8 above the tool axis A is accomplished by appropriate radial shifting of the associated forming-wedge profile 7. The forming-wedge profiles 7 of the forming wedges 7 that are disposed one after another along the forming curve 6 are identical in shape, and are merely shifted in a direction radial to the tool axis, i.e. vertically in FIG. 2. A first forming wedge 7a (lowermost forming-wedge profile in FIG. 2) does indeed engage the previously created thread recess 11, but does not yet press into the floor 12 of the previously created thread recess 11. However, all the subsequent forming wedges 7 do press into the floor 12 of the thread recess 11, and hence contribute to the further or final finishing of the thread.

It can be seen in FIG. 2 that the first forming wedge 7a has a certain degree of freedom with respect to its position parallel to the tool axis A within the previously created thread recess 11, i.e. in the axial direction, which is shown as horizontal in FIG. 2. This results from the fact that the first forming-wedge profile 7a at a given height above the tool axis A (not shown in FIG. 2) has a smaller cross-sectional diameter than the previously created thread recess 11. In practice, this causes the pressure exerted by the forming wedges 7 to be directed not into the center of the floor 12 of the previously created thread recess 11—as would be required for optical finishing of a thread—but rather into a laterally offset position.

Figure 3:
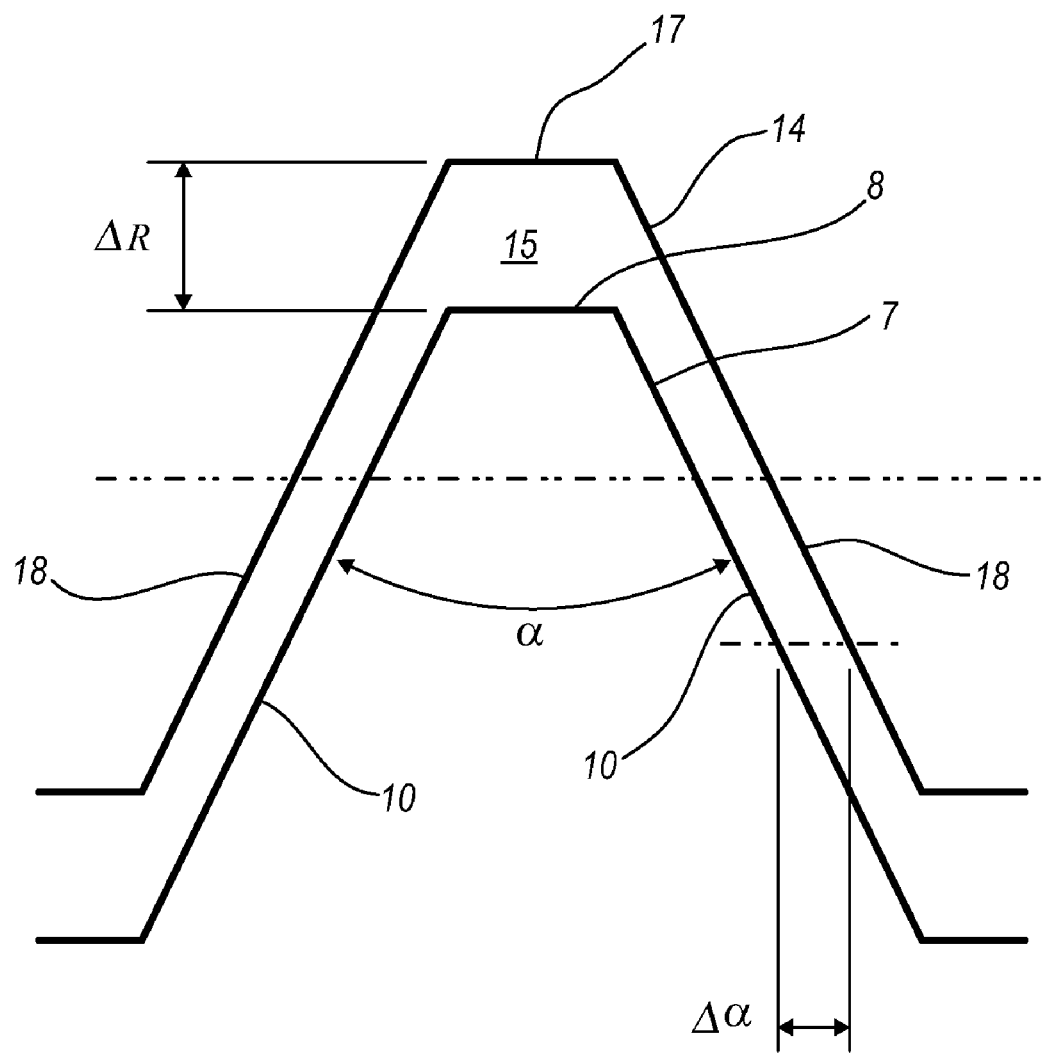

FIG. 3 is a conventional schematic illustration of the arrangement of a forming-wedge profile 7 in relation to a finished thread recess 15 (which has yet to be produced), and the resulting distances. Here $\Delta R$ designates the distance between the forming-wedge tip 8 and the floor 17 of the finished thread recess 15, and $\Delta a$ designates the distance between the forming-wedge flank 10 and the facing flank 18 of the finished thread recess 15, measured parallel to the tool axis A (not shown in FIG. 3, but symbolized for purposes of orientation by the two dot-dash lines). Here, it is assumed that the forming wedge 7 is positioned in the middle of the finished thread recess 15. Between the two forming-wedge flanks 10 is an angle $\alpha$, which in the illustrated example amounts to about 50°, although other angles are also possible. For instance, the angle $\alpha$ for finishing a metric thread is 60°. In the illustrated exemplary embodiment, furthermore, the flanks 18 of the finished thread recess 15 are oriented parallel to the facing forming-wedge flanks 10 in each case.

In a profile gradation based on the exemplary embodiment shown in FIG. 3, which can apply comparably to other profile forms as well, the distance $\Delta R$ decreases, as also does the distance $\Delta a$ according to the following linear relation $$\Delta a = \Delta R \cdot \tan(\alpha/2)$$

Hence the closer a forming-wedge tip 8 comes to an intended thread depth, i.e. the smaller $\Delta R$ is, the smaller the distance $\Delta a$ between flanks 10, 18 also becomes.

It is understood that a previously created thread 9 already corresponds, in its dimensions parallel to the tool axis (i.e., its axial dimensions), substantially to the intended dimensions of a finished thread 14, and that substantially the only difference between the previously created thread and the finished thread relates to the depth of the recess in respective radial dimensions. Accordingly, in the region of the forming wedge 7 that does not penetrate as far as the floor 12 of the previously created thread recess 11, the distance of each forming-wedge flank 10 from the facing flank 13 of the previously created thread recess 11 (not shown in FIG. 3), measured parallel to the tool axis A and hence in the vertical direction in each of the figures, corresponds substantially to the distance $\Delta a$ between forming-wedge flank 10 and flank 18 of the finished thread recess 15. This assumes a central disposition of the forming wedge 7 within the previously created thread recess 11.

Accordingly, in the following distance between forming-wedge flank 10 and facing flank 13 of the previously created thread, recess 11 will likewise be designated by $\Delta a$. The distance $\Delta a$ also determines the axial degree of freedom in the positioning of the forming wedge 7 in the previously created thread recess 11, and this degree of freedom is given by $2 \times \Delta a$, i.e. twice the distance $\Delta a$. This means that, given a centered position of the forming wedge 7, the actual position of the forming wedge 7 can deviate by $\Delta a$ in the tool-advancing direction, and by $\Delta a$ in the direction opposite to that in which the tool is advanced.

In the case of thread-rolling taps in accordance with the invention, their forming wedges 7 now have an expansion 19 on at least one of their flanks 10. The purpose of this expansion 19 is to reduce the above-mentioned axial degree of freedom in positioning the forming wedge 7 within a previously created thread recess 11. Nevertheless, the profile gradation of the forming wedges 7 in the thread-forming portion 3, which is a sensible feature to have for finishing the thread, should be preserved. Therefore the expansion 19 of the forming wedges 7 is produced in a forming-wedge region that does not extend as far as the floor 12 of the previously created thread recess 11.

FIGS. 4 to 8 show schematically in cross-section various embodiments of profile gradations of consecutive forming wedges 7, as they can be constructed in various exemplary embodiments of thread-rolling taps in accordance with the invention. In each case the dot-dash line represents the previously created thread 9, enclosing the previously created thread recess 11. Each of the forming wedges 7 comprises at its base an expansion 19, which is thus constructed as a pedestal. The forming-wedge profile 7 is subdivided into a forming region 20 around the forming-wedge tip 8 and an expansion region 21 at the forming-wedge base, opposite the forming-wedge tip 8. The transition between forming region 20 and expansion region 21 in the embodiments according to FIGS. 5 to 8 consists of a profile shoulder 22. In the embodiment according to FIG. 4 the transition is rounded. In this case, the transition point 23 can be considered to be the place in the profile at which the profile curve or forming-wedge flank 10, having been nearly linear from the forming-wedge tip 8 to this point, changes to an outward curvature, i.e. it curves away from the other forming wedge flank 10.

In FIGS. 4 to 8 it can be seen that the expansion 19 in each case is substantially identically formed for all of the forming wedges 7 disposed in sequence along the forming curve (in FIG. 4, however, this does not apply to the curved region where the transition to the forming region 20 occurs); in particular, all the expansions 19, at least in some sections, have the same diameter at a given height. The profile gradation is brought about essentially within the forming region 20 of the forming wedges 7, where it is analogous to the profile gradation according to the state of the art, as explained with reference to FIG. 2.

Accordingly, the decisive difference between the invention and the state of the art resides in the expansion 19 of the forming wedges 7. This feature causes the distance $\Delta a_{expansion}$ between the forming-wedge flank 10 and the facing flank 13 of the previously created thread recess 11 to be reduced at least in sections in the region of the expansion 19, as measured parallel to the tool axis A and thus shown vertically in the figures, so that the axial degree of freedom in positioning of the forming wedge 7 within the previously created thread recess 11 is also reduced. Hence the expansion ensures that the forming wedge 7 will be positioned as desired. In order to avoid problems with friction and insertion of the tool, however, the value chosen is not $\Delta a_{expansion}=0$ but rather (approximately) $\Delta a_{expansion}=0.75\times \Delta a_{(without\ expansion)}$; that is, the expansion reduces the distance by about 25%.

FIGS. 4 to 8 show in addition to the first forming wedge 7a in each case does not extend as far as the floor 12 of the previously created thread recess. Forming wedge 7a therefore does not carry out any rolling work, but is merely responsible, by way of its expansion 19, for achieving the desired positioning, in particular centering, of the forming wedge 7a in the previously created thread recess 11 and hence of the entire thread-rolling tap 1 with respect to the previously created thread 9. Forming wedge 7a thus defines an insertion region 24 of the thread-forming portion 3 of the thread-rolling tap 1 (cf. FIG. 12). All the following forming wedges 7 do penetrate as far as the floor 12 of the previously created thread recess 11, and hence do contribute toward finishing the thread by rolling.

FIGS. 4 to 8 also show that the final forming wedge 7 in each case, i.e. the uppermost one in each of the figures, does not have an expansion 19. In this forming wedge 7 the profile follows a course corresponding very closely to that of the profile of the finished thread.

Figure 4:
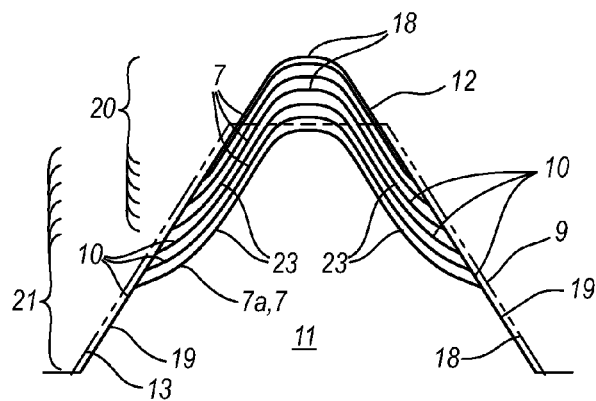
FIGS. 4-8 show schematically in cross-section the profile gradations of consecutive forming wedges in various exemplary embodiments of thread-rolling taps according to the invention.
Figure 5:
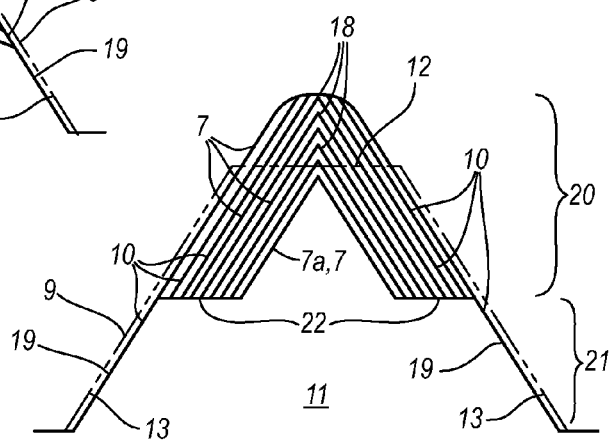
Figure 6:
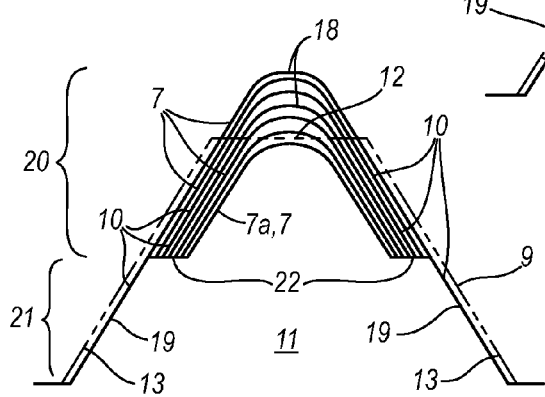
Figure 7:
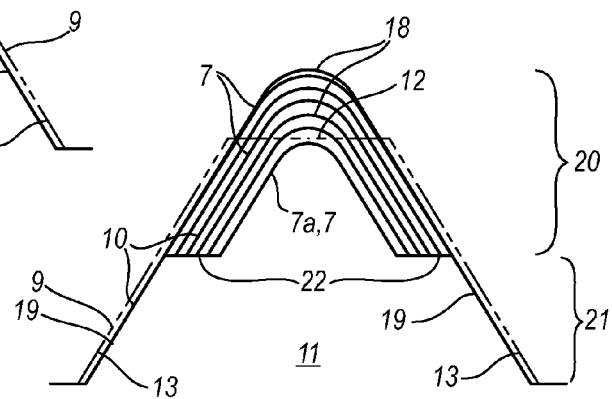
Figure 8:
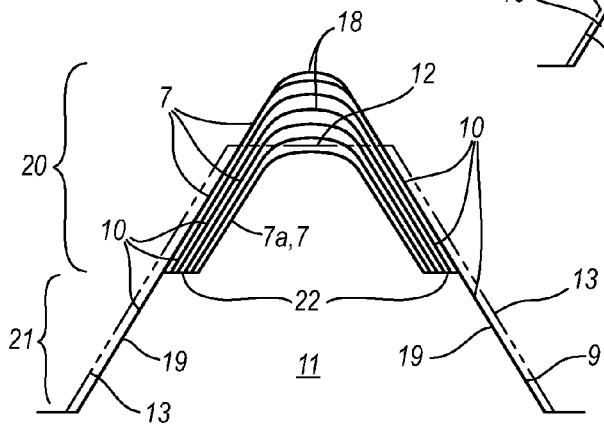

In FIG. 4 the graded profile region of the forming wedges 7, i.e. the forming region 20, has the form of a hill; that is, it is rounded at the tip 8 and flanks 10 of the forming wedge. Starting from the forming-wedge tip 8, the curvature along each flank 10 is at first convex, then changes to concave and finally follows a convex course. This terminates in a sharp inflection, at the boundary of the linear pedestal region (expansion region) of the flank 10. This inflection could of course be rounded. In FIGS. 5 to 8 the forming region 20 has a basically triangular form; in FIG. 5 it is an equilateral triangle, with the two forming-wedge flanks 10 in the forming region 20 at an angle of about 60° to one another. In FIG. 5 the forming-wedge tip 8 is pointed (except for the "higher" wedges 7, which are rounded), whereas in FIGS. 6 and 7 all the tips are rounded and in FIG. 8 they are both rounded and flattened. All embodiments are in particular designed to create a metric screw thread.

Figure 9:
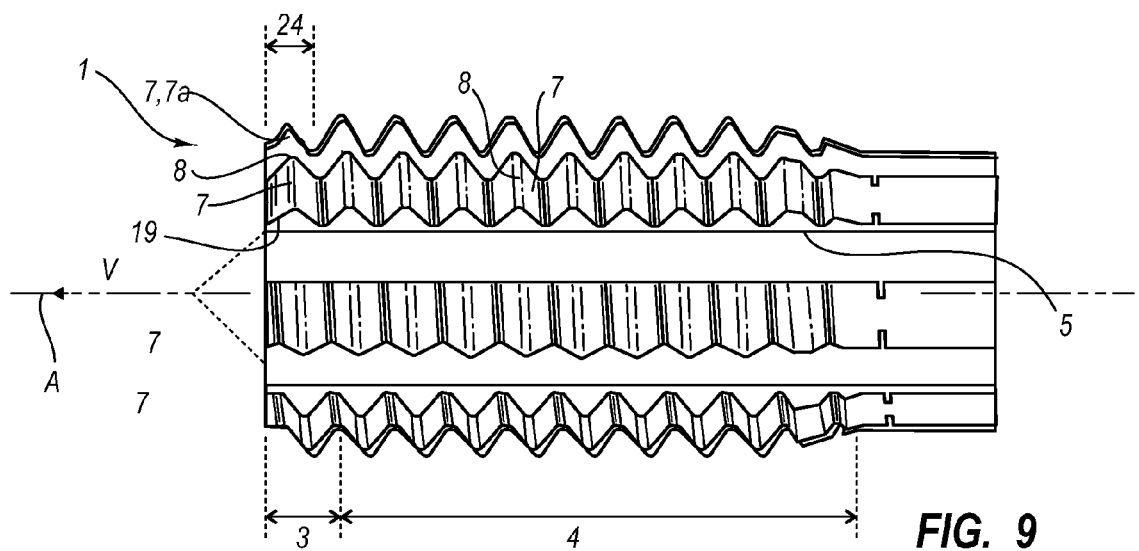
FIG. 9 is a lateral plan view of part of an exemplary embodiment of a thread-rolling tap according to the invention with forming-wedge profiles as shown in FIG. 4.
Figure 10:
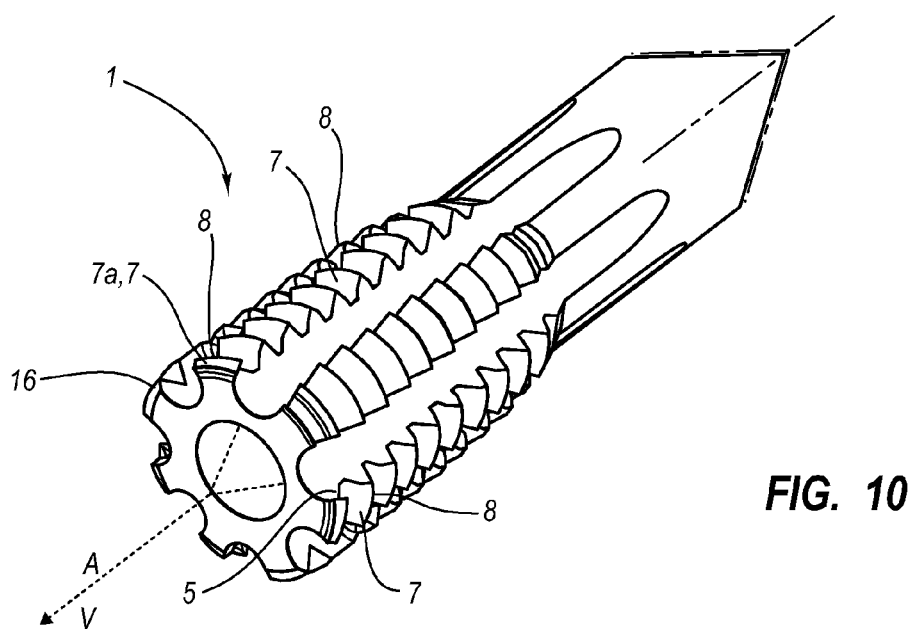
FIG. 10 shows schematically a three-dimensional partial view of the exemplary embodiment according to FIG. 9.

FIG. 9 is a schematic drawing of the side surface of the part of an exemplary embodiment of a thread-rolling tap 1 according to the invention, and FIG. 10 is a three-dimensional drawing thereof. The tool axis A and the tool-advancing direction V are shown. A thread-forming portion 3 of the tool comprises forming wedges 7 with profiles as shown in FIG. 4. The expansions 19 of the forming wedges 7 can be discerned. The thread-forming portion 3 of the tool is adjacent to a calibration portion 4 with forming wedges 7 that are substantially identically constructed and have substantially the shape of a thread recess after finishing has been completed. The forming-wedge tips 8 are visible in each case, as is the tool core 5 on which the forming wedges 7 are seated. A first forming wedge 7a is constructed so that when it enters the previously created thread recess 11 (not shown in FIGS. 9 and 10) it does not penetrate into the material of the workpiece itself, i.e. it does no rolling work. Therefore it defines an insertion region 24 that has an axial guidance function, but no rolling function. It can also be seen in FIG. 10 that ahead of the first forming wedge 7a, in the direction opposite to the tool-advancing direction V, still another, incomplete forming wedge 16 is disposed. This forming wedge 16 was ground out in the course of removing burrs or constructing a chamfer at the tip of the tool. Nevertheless, it functions at least to aid introduction or manipulation when the tool is being inserted into the previously created thread.

FIG. 10 also shows that the tool 1 represented there exhibits a heptagonal cross section and that the forming wedges 7 are disposed in such a way that every seventh wedge lies in a plane that also contains the tool axis A. In other words, every seventh forming wedge 7 is disposed substantially along one (straight) line. In a single passage around the circumference of the tool 1, seven forming wedges 7 are encountered.

Figure 11:
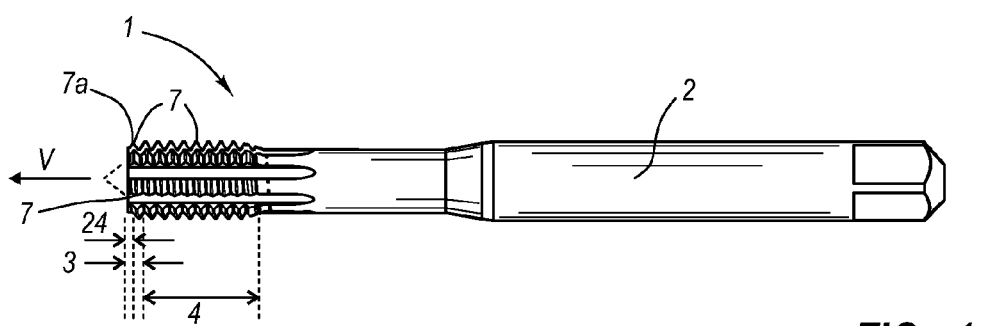
FIG. 11 shows schematically a lateral plan view of the entire embodiment of the tool according to FIG. 9.

FIG. 11 shows schematically a side view of the complete exemplary embodiment of a thread-rolling tap 1 according to FIGS. 9 and 10. The forming wedges 7 can be seen in schematic form. The thread-rolling tap 1 comprises on the side of the right in FIG. 11 a tool shank 2 by way of which the thread rolling tap 1 is held in a threading device (tool machine). The operating region is subdivided into the thread-forming portion 3 and the calibration portion 4; in the portion 3 the height of the forming wedges 7 increases in the direction opposite to the direction V in which the thread-rolling tap 7 is advanced, whereas in the calibration portion 4 the wedge height is substantially constant. The thread-rolling tap 1 also comprises an insertion portion 24, which appears on the left side of the thread-forming portion 3 in FIG. 11 but still forms part of the thread-forming portion 3. In this insertion portion 24 the forming wedge 7a is constructed so that as the tool is pushed formed into the workpiece, although it does engage the previously created thread recess 11 and thus—by way of appropriately constructed expansions 19—determines the axial positioning of the thread-rolling tap 1 relative to the previously created thread 9, it does not penetrate into the floor 12 of the previously created thread recess 11, and hence does no rolling work (not shown in FIG. 11). The forming wedge 7a of the insertion portion 24 thus takes over the axial guidance function, whereas the remaining forming wedges 7 in the thread-forming portion 3 are responsible for most of the rolling work and the forming wedges 7 in the calibration portion 4 calibrate and smooth the thread thus produced and thereby accomplish the final finishing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A tool for finishing a previously created thread, such as an internal thread, without cutting, comprising:
   a) at least one thread-forming portion that rotates about a tool axis, the thread-forming portion having multiple forming wedges;
   b) wherein the forming wedges in cross-section comprise two flanks that diverge from one another beginning at a forming wedge tip, the forming wedge tip being shaped as any of an acute angle, a rounded region, or a flattened region;
   c) wherein at least one of the two flanks include at least one expansion for positioning the forming wedge in the previously created thread;
   d) wherein the plurality of forming wedges exhibits substantially the same expansion with substantially the same cross-sectional shape in a forming region that extends from the forming wedge tip of each forming wedge to the expansion, such that the cross-sectional shape is convexly curved in a first section, concavely curved in a second section, and convexly curved again in a third section.

2. The tool as recited in claim 1, wherein a radial distance of the forming wedge tip from the tool axis increases in a direction opposite to a direction in which the tool is moved forward.

3. The tool as recited in claim 1, wherein one or more of:
   (i) the at least one expansion in two or more forming wedges has one or more of substantially the same cross-sectional shape, profile, or dimensions for each flank in each of the two or more forming wedges; or
   (ii) a diameter of the forming wedge at a given height above the tool axis in a region of expansion is substantially the same for all of the multiple forming wedges that have an expansion of the flanks.

4. The tool as recited in claim 1, wherein transitions of the two flanks between the forming region and the at least one expansion are at least partially rounded.

5. The tool as recited in claim 1, wherein the multiple forming wedges are disposed in succession along a forming curve that runs around the tool axis in a spiral, screw-thread, or helical shape.

6. The tool as recited in claim 5, further comprising multiple thread-forming portions that follow one another axially with respect to the tool axis, the multiple thread-forming portions being spaced apart from one another, extending perpendicular to the tool axis, and possessing at least one forming wedge, such that each at least one forming wedge of each of the multiple thread-forming portions is disposed one after another axially with respect to the tool axis in an arrangement that is any of (i) substantially parallel to the tool axis, (ii) substantially turning or twisted around the tool axis, or (ii) in the form of a screw thread.

7. The tool as recited in claim 1, wherein a cross-sectional shape of a forming region in the multiple forming wedges, increases progressively and/or linearly, such that the forming regions corresponding to the multiple forming wedges follow each other in a direction opposite to a direction in which the tool is pushed forward.

8. The tool as recited in claim 1, wherein the two flanks exhibit a conical nature, such that an angle formed thereon is different from one pair of flank points to another pair of flank points in any one or more of (i) at the forming region, (ii) at the wedge tip between about 5° and about 20°, or (iii) in the region of the at least one expansion between about 0° and about 2°.

9. The tool as recited in claim 1, wherein the at least one thread-forming portion comprises a tool core that extends along the tool axis, the tool core having a constant diameter along any of (i) the tool axis, or (ii) along the outer surface of which the forming wedges are disposed, such that a height of the multiple forming wedges increases along a forming curve in a direction opposite to a direction in which the tool is pushed forward.

10. The tool as recited in claim 1, wherein the at least one expansion comprises a pedestal of a corresponding one of the multiple forming wedges.

11. The tool as recited in claim 1, wherein the at least one expansion for each of the multiple forming wedges is engaged in a corresponding recess of the previously created thread, such that the corresponding forming wedge for the at least one expansion is positioned in the corresponding recess in the previously created thread.

12. The tool as recited in claim 11, wherein a forming wedge tip of at least one of the multiple forming wedges penetrates into a ground section of the corresponding recess in the previously created thread as the tool is advanced into the previously created thread.

13. The tool as recited in claim 11, wherein a side of the at least one thread-forming portion, as it is disposed in a tool-advancing direction, further comprises an insertion portion having one or more forming wedges, each forming wedge having at least one expansion, such that the forming wedge tip of the at least one thread-forming portion does not penetrate into a ground section of the recess in the previously created thread as the tool is advanced into the previously created thread, and such that an insertion portion of the thread-forming portion includes a first forming wedge in a direction opposite to a tool-advancing direction.

14. The tool as recited in claim 13, wherein a diameter of at least one of the one or more forming wedges in a sub-region of the at least one expansion is any of at least 90% of, or substantially equal to, the diameter of the corresponding recess in the previously created thread at a corresponding height above the tool axis of the inserted tool.

15. The tool as recited in claim 13, wherein one or more of:
   (i) a diameter of at least one of the one or more forming wedges in a forming region that extends from the corresponding forming wedge tip to the corresponding at least one expansion, insofar as it does not penetrate into the ground section of the recess of the previously created thread, is less than about 90% to less than about 80% of the diameter of the recess in the previously created thread at a corresponding height above the access of the inserted tool; or
   (ii) the difference between the recess diameter and the corresponding forming-wedge diameter is at least about 25% to less than about 10% smaller in the region of the at least one expansion than in the forming region.

16. The tool as recited in claim 1, wherein a diameter of any of the multiple forming wedges in a forming region increases in a direction opposite to a direction in which the tool is advanced, such that the increase corresponds to an increase of a radial distance between the forming wedge tips and the tool axis, such that the diameter is linearly dependent on the radial distance.

17. The tool as recited in claim 1, wherein a last forming wedge of the thread-forming portion, in a direction opposite to a tool-advancing direction, has no at least one expansion of its corresponding two flanks, and wherein its cross-sectional dimension corresponds substantially to a cross-sectional dimension of a finished thread recess.

18. The tool as recited in claim 1, wherein:
in a direction opposite to a tool-advancing direction, the thread-forming portion is followed by a calibration portion having forming wedges disposed in succession along a curve that passes around the tool axis, the curve having a spiral, screw-thread, or helix shape; and
a curve in the thread-forming portion merges continuously with the curve of the calibration portion, such that both curves exhibit the same pitch along the tool axis, and such that one or more of:
(i) a cross-sectional dimension of one or more multiple forming wedges in the calibration portion is substantially the same as a cross-sectional dimension of a finished thread recess;
(ii) the radial distance of the forming wedge tips from the tool axis in the calibration portion is substantially the same, or decreases, in the direction opposite to the tool-advancing direction; or
(iii) the radial distance of the forming wedge tips at the transition to the thread-forming portion corresponds to the largest radial distance of the tips of the forming wedges in the thread-forming portion (3).

19. The tool as recited in claim 1, wherein at least the thread-forming portion and/or a calibration portion, in its cross-section perpendicular to the tool axis, has an approximately polygonal shape having a number of e corners equal to one of three, four, five, six, or seven, such that every $e^{th}$ one of the immediately consecutive forming wedge tips is disposed in a single plane containing the tool axis.

20. The tool as recited in claim 1, wherein the forming wedges are produced at least partially by any one or more of grinding and wheel dressing.

21. A method of creating a screw thread in a work piece, in particular an internal thread comprising the steps of:
a) creating an initial thread by one of cutting means or non-cutting means, wherein the non-cutting means include any one or more of tapping, milling, turning, grinding, winding, or rolling; and
b) finishing the initial thread without cutting by using a tool that has a plurality of forming wedges that, in cross-section, exhibit two flanks, such that at least one of the forming wedges is centered in the previously created initial thread by at least one of the exhibited two flanks, the at least one of the exhibited two flanks including an expansion for positioning the at least one forming wedge in the previously created thread;
c) wherein the plurality of forming wedges exhibits substantially the same expansion with substantially the same cross-sectional shape in a forming region that extends from the forming wedge tip of each forming wedge to the expansion, such that the cross-sectional shape is convexly curved in a first section, concavely curved in a second section, and convexly curved again in a third section.

22. The method as recited in claim 21, wherein creating the initial thread further comprises the steps of:

a) producing an initial cylindrical bore; and
b) tapping the initial cylindrical bore with a thread tapper to create the initial thread, such that an outside diameter of the initial thread is smaller than an outside diameter of the finished thread that is created.

23. The method as recited in claim 21, wherein the step of finishing the initial thread further comprises:
a) rotating at least one thread-forming portion of the tool about a tool axis;
b) pushing forward in a tool-advancing direction the at least one thread-forming portion, the at least one thread-forming portion having one or more forming wedges disposed consecutively along a forming curve that passes around the tool axis in the shape of any of a spiral, a screw thread, or a helix; and
c) finishing the initial thread by engaging the previously created thread with the one or more forming wedges, such that one or more of the one or more forming wedges are pressed into a work piece surface in a region of the previously created thread.

24. The method as recited in claim 21, wherein the step of finishing the initial thread further comprises:
a) rotating axially offset thread-forming portions of the tool about a tool axis;
b) moving the tool relative to a work piece by pushing the axially offset thread-forming portions in a tool-advancing direction parallel to the tool axis, thereby causing a circular movement of the tool relative to the work piece, such that the tool axis coincides with a central axis of the initial thread; and
c) pressing the at least one forming wedge into a work piece surface to thereby finish the initial thread.

25. The method as recited in claim 21, wherein the step of finishing of the initial thread further comprises:
smoothing and/or calibrating the initial thread by advancing one or more forming wedges in a calibration portion of the tool in a direction opposite to a tool-advancing direction, the calibration portion of the tool being adjacent to the thread-forming portion of the tool.

26. The method as recited in claim 21, wherein the step of finishing the initial thread further comprises:
engaging the previously created initial thread with one or more forming wedges that include the two flanks, and include the at least one expansion of one or more of the two flanks;
wherein the one or more forming wedges are positioned in an insertion portion at a side of the thread-forming portion that faces in a tool-advancing direction, such that the one or more forming wedges are not pressed into a work piece surface in a region of the previously created initial thread.

27. A tool for finishing a previously created thread, such as an internal thread, without cutting, comprising:
a) at least one thread-forming portion that rotates about a tool axis, the thread-forming portion having multiple forming wedges;
b) wherein the forming wedges in cross-section comprise two flanks that diverge from one another beginning at a forming wedge tip, the forming wedge tip being shaped as any of an acute angle, a rounded region, or a flattened region;
c) wherein at least one of the two flanks include at least one expansion for positioning the forming wedge in the previously created thread;
d) wherein the plurality of forming wedges exhibits substantially the same cross-sectional shape in a forming region that extends from the forming-wedge tip of each forming wedge to the expansion, such that the forming region has an at least approximately polygonal shape in cross-section, including any of a triangle, quadrangle, or trapezoid shape, the corners of the polygonal shape being any one or more of pointed or rounded.

28. A tool for finishing a previously created thread, such as an internal thread, without cutting, comprising:
   a) at least one thread-forming portion that rotates about a tool axis, the thread-forming portion having multiple forming wedges;
   b) wherein the forming wedges in cross-section comprise two flanks that diverge from one another beginning at a forming wedge tip, the forming wedge tip being shaped as any of an acute angle, a rounded region, or a flattened region;
   c) wherein at least one of the two flanks include at least one expansion for positioning the forming wedge in the previously created thread;
   d) wherein the plurality of forming wedges exhibits substantially the same cross-sectional shape in a forming region that extends from the forming-wedge tip of each forming wedge to the expansion, such that the cross-sectional shape of the forming region is one of an isosceles triangle, a triangle with a 60° internal angle, or an equilateral triangle, the triangle having a rounded or flattened tip.

29. A method of creating a screw thread in a work piece, in particular an internal thread comprising the steps of:
   a) creating an initial thread by one of cutting means or non-cutting means, wherein the non-cutting means include any one or more of tapping, milling, turning, grinding, winding, or rolling; and
   b) finishing the initial thread without cutting by using a tool that has a plurality of forming wedges that, in cross-section, exhibit two flanks, such that at least one of the forming wedges is centered in the previously created initial thread by at least one of the exhibited two flanks, the at least one of the exhibited two flanks including an expansion for positioning the at least one forming wedge in the previously created thread;
   c) wherein the plurality of forming wedges exhibit substantially the same expansion with substantially the same cross-sectional shape in a forming region that extends from the forming wedge tip of each forming wedge to the expansion, such that the forming region has an at least approximately polygonal shape in cross-section, including any of a triangle, quadrangle, or trapezoid shape, the corners of the polygonal shape being any one or more of pointed or rounded.

30. A method of creating a screw thread in a work piece, in particular an internal thread comprising the steps of:
   a) creating an initial thread by one of cutting means or non-cutting means, wherein the non-cutting means include any one or more of tapping, milling, turning, grinding, winding, or rolling; and
   b) finishing the initial thread without cutting by using a tool that has a plurality of forming wedges that, in cross-section, exhibit two flanks, such that at least one of the forming wedges is centered in the previously created initial thread by at least one of the exhibited two flanks, the at least one of the exhibited two flanks including an expansion for positioning the at least one forming wedge in the previously created thread;
   c) wherein the plurality of forming wedges exhibits substantially the same expansion with substantially the same cross-sectional shape in a forming region that extends from the forming wedge tip of each forming wedge to the expansion, such that the cross-sectional shape of the forming region is one of an isosceles triangle, a triangle with a 60° internal angle, or an equilateral triangle, the triangle having a rounded or flattened tip.

* * * * *

UNITED STATES PATENT AND TRADEMARK OFFICE
CERTIFICATE OF CORRECTION

PATENT NO. : 7,354,350 B2
APPLICATION NO. : 11/178837
DATED : April 8, 2008
INVENTOR(S) : Hechtle et al.

It is certified that error appears in the above-identified patent and that said Letters Patent is hereby corrected as shown below:

Column 3
Line 53, change "Maxis" to --axis--

Column 5
Line 59, before "isosceles", change "in" to --an--

Column 11
Line 39, before "First forming wedge", change "8" to --7a--
Line 40, before "Forming-wedge tip", change "9" to --8--
Line 41, before "Previously created thread", change "10" to --9--
Line 42, before "Forming-wedge flanks", change "11" to --10--
Line 43, before "Previously created thread recess", change "12" to --11--
Line 43, after "recess", remove [11]
Line 44, after "recess", remove [11]
Line 59, change "$\Delta a$" to --$\Delta \alpha$--

Column 12
Line 21, change "portion" to --portions--

Column 13
Line 62, change "$\Delta a$" to --$\Delta \alpha$--

Column 14
Line 12, change "$\Delta a$" to --$\Delta \alpha$--
Line 13, in the equation, change "$\Delta a$" to --$\Delta \alpha$--
Line 17, change "$\Delta a$" to --$\Delta \alpha$--
Line 32, change "$\Delta a$" to --$\Delta \alpha$--
Line 38, change "$\Delta a$" to --$\Delta \alpha$--
Line 42, change "$2 \times \Delta a$" to --$2 \times \Delta \alpha$--
Line 42, after "distance", change "$\Delta a$" to --$\Delta \alpha$--
Line 44, change "$\Delta a$" to --$\Delta \alpha$--

Column 15
Line 26, change "$\Delta a$" to --$\Delta \alpha$--
Line 36, change "$\Delta a_{expansion}=0$" to --$\Delta \alpha_{expansion}=0$--
Line 36, change "$\Delta a_{expansion}=0.75$" to --$\Delta \alpha_{expansion}=0.75$--
Line 37, change "$\Delta a$" to --$\Delta \alpha$--
Line 49, after "tap 1", remove [(cf. FIG. 12)]

CERTIFICATE OF CORRECTION (continued)
U.S. Pat. No. 7,354,350 B2

Column 19
Line 8, remove [no]

Signed and Sealed this

Fifth Day of January, 2010

David J. Kappos
*Director of the United States Patent and Trademark Office*